Jan. 27, 1942.   D. KEES ET AL   2,271,504
OUTLET BOX HANGER
Filed March 18, 1940
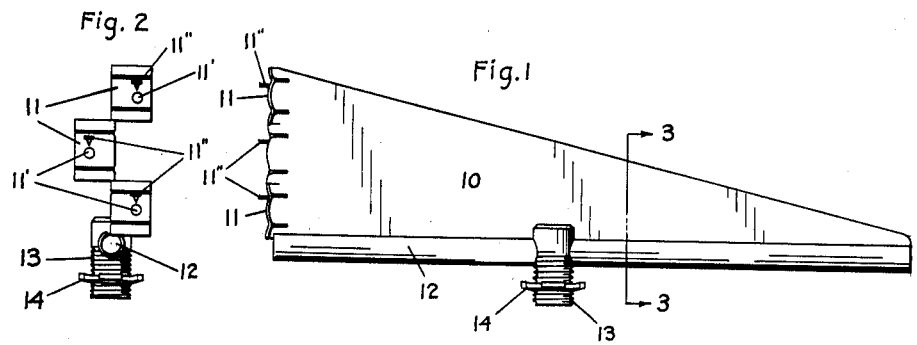
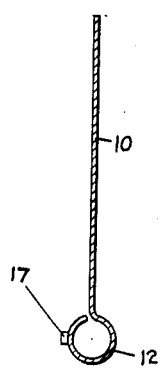
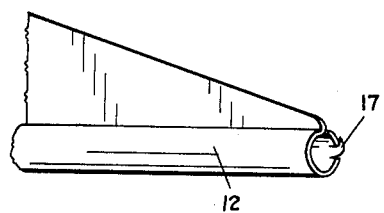
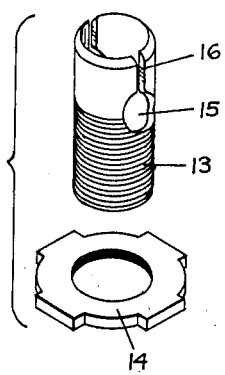
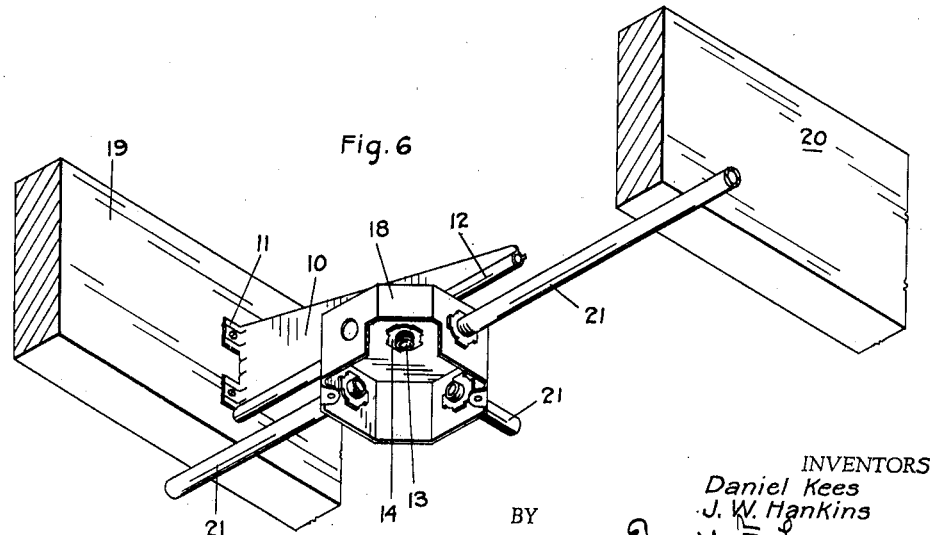
INVENTORS
Daniel Kees
J. W. Hankins
BY
ATTORNEY.

Patented Jan. 27, 1942

2,271,504

UNITED STATES PATENT OFFICE 2,271,504

OUTLET BOX HANGER

Daniel Kees, Beatrice, Nebr., and James W. Hankins, Chillicothe, Mo.

Application March 18, 1940, Serial No. 324,640

7 Claims. (Cl. 174—63)

Our invention relates to supports for outlet boxes in electric wiring systems, the invention having for one of its objects the provision of a bracket which facilitates installation of outlet boxes with less time and labor than is required with prior supports, thus materially reducing the costs of large contracts.

Another object is the provision of a support for outlet boxes, the support being adapted for attachment to a joist or rafter and capable of supporting any weight which it might be called upon to support.

Another object of the invention is the provision of an outlet box support which may be applied to old buildings as well as to buildings under construction.

Another object is the provision of an outlet box bracket which may be adjusted relative to a joist or rafter and on which the outlet box may be adjusted.

Another object is the provision of an outlet box bracket which may be adjusted on a joist or rafter through a wide range of adjustment and without notching the joist.

Having in view these objects and others which will be pointed out in the following description, we will now refer to the drawing, in which Figure 1 is a view in side elevation of our outlet box bracket.

Figure 2 is an elevational view of the rear end of our outlet box bracket.

Figure 3 is a sectional view on the lines 3—3 of Figure 1 looking in the direction of the arrows.

Figure 4 is a perspective view of the fixture stud and lock nut of our outlet box bracket.

Figure 5 is a perspective view of a fragment of our outlet box bracket showing particularly the stop at the forward end of the bracket for preventing the slipping off of the fixture stud while installing the bracket.

Figure 6 is a perspective view of a portion of a ceiling and showing the use of our outlet box bracket in the installation of an outlet box in the ceiling, the view being from below as seen when looking up at an angle.

The outlet box bracket is in the form of a scalene right triangle having means for attachment to a joist or rafter and having other means for the adjustable positioning of an outlet box. The body 10 of the bracket has a shorter leg having a plurality of apertured ears 11 which are outturned perpendicularly in opposite directions whereby the bracket may be secured in the desired position by means of nails or screws or the like. The longer of the two legs is formed at 12 to form a bar-like roll for the slidable reception of a stud 13. The part 12 is shown as cylindrical and this is the preferred form because of the ease of manufacture but is obvious that this form may be varied since many other forms would be equally serviceable in carrying out the function.

As best shown in Figure 4, the stud 13 is cylindrical, the lower portion being externally screw threaded for the reception of a lock nut 14. The walls of the cylindrical stud are provided with diametrically positioned circular apertures 15 having a diameter which is slightly greater than the external diameter of the roll or bar 12. The stud is also provided with a pair of slits 16 each extending from an aperture 15 to the rim of the stud. The width of the slits 16 is slightly greater than the thickness of the material of the body portion 10. With this construction the stud may be slipped over the end of the roll 12 to be freely slidable lengthwise thereon but prevented from turning. For preventing the stud from slipping off the roll 12, we provide a stop 17 by slightly deforming the metal of the roll 12 at the extremity. The stud is prevented by the ears 11 from slipping off the rear of the roll 12.

In Figure 6 we show our construction in installing an outlet box 18 between two joists 19 and 20 for supporting electrical fixtures from the ceiling. The desired spot in the ceiling is selected and the outlet box bracket is secured as shown to the joist 19 with the roll 12 in the vertical plane of the selected spot and at the desired height above the bottom of the joist. The outlet box 18 is secured to the stud 13 which passes downwardly through a central aperture in the top of the outlet box. The box is slidable on the roll 12 and when it is in the required position, the lock nut 14 is drawn tight to firmly secure the outlet box in the position selected for it. Since, as indicated in the drawing, the stud is of uniform diameter the outlet box will slide over the stud to engage the roll 12 and will be clamped between the roll and nut 14. This clamping action will cause the box, the stud and the roll 12 to be held rigidly together in the desired position. The outlet box is provided with a plurality of knock-out holes for receiving the conduits 21.

The outlet box bracket above described is a universal hanger. It will support any kind of outlet box whether shallow, medium, or deep. It will support the outlet box at the proper depth in any kind of ceiling, whether of wood, ply wood, lath and plaster, felt, or any other ceiling. Since it fastens to the side of the joist, it does not interfere with the ceiling regardless of the kind of ceiling. The bracket is useful in old buildings as well as in new constructions. It may be used with any kind of wire, conduit, steel tube, flex steel, loom wire or knob and tube.

The bracket is short, light, clean and easy to handle anywhere. It is strong, being capable of supporting any weight which may be put upon it in electrical construction, even if the weight is supported from the extreme end of the bracket.

Having thus described our invention in such full, clear and exact terms that its construction and operation will be readily understood by others skilled in the art to which it pertains, what we claim as new and desire to secure by Letters Patent of the United States is:

1. An outlet box bracket adapted to be secured in vertical position to a joist or the like, the lower edge of said bracket being rolled for a substantial portion of the length thereof, a fixture stud having an aperture for the reception of said rolled portion and a slot above said aperture of a width at least as great as that of the plate, the aperture of said stud being slightly greater in diameter than the external diameter of said rolled portion whereby said stud is slidably adjustable on said rolled portion, an outlet box having an aperture for freely receiving the lower portion of said stud, the lower portion of said stud being externally screw threaded, and a nut engaging said stud for clamping said outlet box between said nut and said rolled portion and thereby clamping said stud with respect to said rolled portion.

2. An outlet box bracket adapted to be secured in vertical position to a joist or the like, the lower edge of said bracket being rolled for a substantial portion of the length thereof, a fixture stud having an aperture for the reception of said rolled portion and a slot above said aperture of a width at least as great as that of the plate, the aperture of said stud being slightly greater in diameter than the external diameter of said rolled portion whereby said stud is slidably adjustable on said rolled portion, an outlet box having an aperture for receiving the lower portion of said stud and of a diameter greater than the external diameter of said stud at any point beyond said rolled portion, the lower portion of said stud being externally screw threaded, and a nut engaging said stud for clamping said outlet box between said nut and said rolled portion and thereby clamping said stud with respect to said rolled portion.

3. An outlet box bracket comprising an elongated triangular flat plate having means along an end edge thereof for fastening said plate to a support, the lower long edge of said plate being rolled for a substantial portion of the length thereof, a fixture stud having an aperture for the reception of said rolled portion and a slot above said aperture of a width at least as great as that of the plate, the aperture of said stud being slightly greater in diameter than the external diameter of said rolled portion whereby said stud is slidably adjustable on said rolled portion, an outlet box having an aperture for receiving the lower portion of said stud and of a diameter greater than the external diameter of said stud at any point beyond said rolled portion, the lower portion of said stud being externally screw threaded, and a nut engaging said stud for clamping said outlet box between said nut and said rolled portion and thereby clamping said nut with respect to said rolled portion.

4. An outlet box bracket in the form of an elongated flat sheet member having an upper edge inclined downwardly away from a relatively short end edge, outturned apertured ears projecting from said short end edge, a bar along the lower edge of said bracket for substantially the full length thereof, a fixture stud having an aperture for the reception of said bar, the aperture of said stud being slightly greater in size than the cross sectional area of said bar, an outlet box having an aperture for receiving the lower portion of said stud, the lower portion of said stud being externally screw threaded, and a nut engaging said stud for clamping said outlet box in position on said stud, the length of said longer leg being substantially larger than the largest dimension of the outlet box to be secured thereto.

5. An outlet box bracket in the form of a substantially complete scalene right triangle, outturned apertured ears projecting in opposite directions from the shorter of the legs of said triangular bracket, a bar along the lower longer edge of said bracket for substantially the full length thereof, a fixture stud having an aperture for the reception of said bar, the aperture of said stud being slightly greater in size than the cross sectional area of said bar, an outlet box having an aperture for freely receiving the lower portion of said stud, the lower portion of said stud being externally screw threaded, and a nut engaging said stud for clamping said outlet box in position on said stud, the length of said longer leg being substantially larger than the largest dimension of said outlet box.

6. An outlet box bracket in the form of a substantially complete scalene right triangle, fastening means associated with the shorter of the legs of said triangular bracket, a bar along the lower longer edge of said bracket for substantially the full length thereof, a fixture stud having an aperture for the reception of said bar, the aperture of said stud being slightly greater in size than the cross sectional area of said bar, an outlet box having an aperture for freely receiving the lower portion of said stud, the lower portion of said stud being externally screw threaded, and a nut engaging said stud for clamping said outlet box between said nut and said bar and thereby clamping said stud with respect to said bar, the length of said longer leg being substantially larger than the largest dimension of said outlet box.

7. An outlet box bracket in the form of a substantially complete scalene right triangle, outturned apertured ears projecting in opposite directions from the shorter of the legs of said triangular bracket, a bar along the lower longer edge of said bracket for substantially the full length thereof, a fixture stud having an aperture for the reception of said bar, the aperture of said stud being slightly greater in size than the cross sectional area of said bar, an outlet box having an aperture for freely receiving the lower portion of said stud, the lower portion of said stud being externally screw threaded, and a nut engaging said stud for clamping said outlet box between said nut and said bar and thereby clamping said stud with respect to said bar, the length of said longer leg being substantially larger than the largest dimension of said outlet box.

DANIEL KEES.
JAMES W. HANKINS.